D. W. ADAMS.
RANGE FINDER MAP.
APPLICATION FILED APR. 18, 1911.
1,010,338. Patented Nov. 28, 1911.
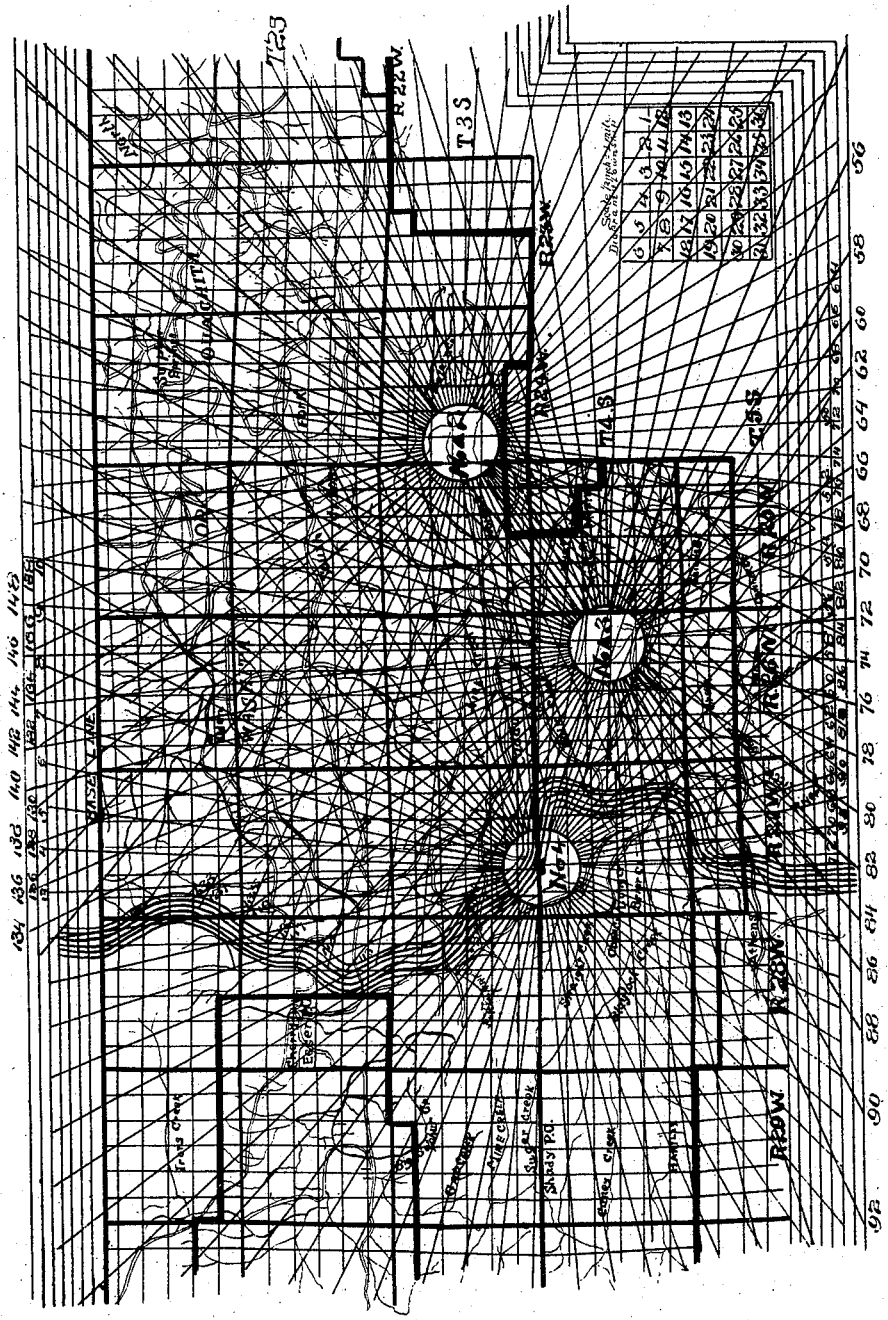

UNITED STATES PATENT OFFICE.

DANIEL W. ADAMS, OF GLENDALE SPRINGS, NORTH CAROLINA.

RANGE-FINDER MAP.

1,010,338. Specification of Letters Patent. Patented Nov. 28, 1911.

Application filed April 18, 1911. Serial No. 621,907.

*To all whom it may concern:*

Be it known that I, DANIEL W. ADAMS, a citizen of the United States, residing at Glendale Springs, in the county of Ashe and State of North Carolina, have invented new and useful Improvements in Range-Finder Maps, of which the following is a specification.

My invention relates to an improvement in maps which are provided with range lines extending across the district covered for the purpose of precisely locating any particular point or object.

While my map is particularly adapted for use in locating fires, it will also prove to be useful for other purposes, as for instance in locating vessels in a harbor with respect to mines, etc.

The object of my invention is to provide a map which shall accurately locate an object when its direction has been determined from two or more positions or stations, without the necessity of calculation or employing latitudes and departures and without the use of mathematical instruments.

My invention will be understood from the following description in connection with the accompanying drawing, which represents a map embodying the invention.

The map depicted in the drawing is a portion of the national forest reserve in the southern portion of the State of Arkansas, and was prepared for use in connection with my range finder for precisely locating forest fires. The entire district is divided into townships by vertical and horizontal lines, each township being subdivided into thirty-six sections, usually one mile square. The vertical rows of township divisions are designated as tiers and are counted downward from the base line at the top of the map. The horizontal rows are termed ranges and are designated as so many ranges west of the meridian. Thus, station marked No. 3, is in tier 4 south (T. 4. S.) and range 26 west (R. 26. W.). The boundary line of the forest reserve is indicated by the heavy lines. Thus it will be observed that the northeast portion of township T. 4. S. and R. 25. W., is not included in the reserve. The streams and rivers, and, if desired, the topographical lines are used to indicate the physical characteristics of the land. These divisions, lines, and designations are commonly employed in maps used in the Government service.

My invention comprises the addition of deflection lines radiating from certain observation stations or towers, and boundary index lines by means of which the designation of any range line may be instantly observed. The circles marked No. 2, No. 3, and No. 4, indicate the location of stations which may be provided with observation towers each of which is provided with a central sight, and a series of concentric, vertical, regularly spaced sight elements for wires, such as disclosed in my Patent No. 1,003,854, dated September 19, 1911. I have found in practice that it is most convenient to employ one hundred and forty four sight wires at each station, which are regularly spaced around the outer wall of the tower. The deflection lines, which radiate in all directions from each observation station, correspond with the respective sight elements.

Surrounding the diagram and forming a margin for the map upon all sides, are a series of parallel lines corresponding in number to the observation towers. For purposes of illustration, I have shown these marginal lines extending only along the top and bottom of the map. It will be observed that the deflection lines from the observation station No. 3 terminate in the outer marginal lines, and that these intersections are numbered to correspond with the sight elements of the tower. The deflection lines radiating from observation tower No. 2 terminate in intersections with the second marginal line, and are likewise numbered to correspond with the sight elements in tower No. 2. The lines radiating from the observation or range tower No. 4 terminate in intersections with the third marginal line, and are correspondingly designated, and if there were additional stations, or if others were at any time added, the radiating deflection lines would terminate in the fourth, fifth, sixth, etc., marginal line. In actual construction of these maps, I have found it convenient to make the circle surrounding each tower or station and the corresponding deflection lines in one color of ink and those of each other station in a separate distinctive color, the marginal lines being correspondingly colored, so that the eye will recognize at a glance to what station any deflection line belongs. This use of different colors also greatly assists the eye and makes it very easy to follow any particular line across the map, even though there are numerous sets of intersecting lines.

When a high ridge of land, such as a range of mountains, crosses the district, it is evident that the stations on one side of the mountain range cannot coöperate with the stations upon the other side in making observations of the same object. It is, therefore, unnecessary to project the deflection lines across this high ridge. Under these circumstances, I lay out a series of parallel index lines across the map upon the line of the high ridge, and permit the range lines from the stations upon either side to terminate in one or another of these lines, indicating at the points of intersection the numerals indicating the corresponding sight element. I have shown such a series of parallel index lines running irregularly across the map from top to bottom and passing through the circle at range tower station No. 4, and it will be observed that the intersecting deflection lines from station No. 2, terminate in the third line from the right and do not cross the ridge indicated by these parallel index lines.

When the rangers or watchmen at each of the different stations or observation towers are provided with a map of the district made in accordance with my invention, it is a very simple matter to determine the exact location of a fire. If, for instance, the watchman at station No. 2 discovers smoke rising at some point, he first notes the designating number of the deflection-line indicator or sight element which is in line with his central sight, and then signals by telephone or other means with the watchman at station No. 3. The latter sights the smoke, noting his sight element in line therewith, and reports the designating number to watchman of station No. 2. Each watchman now notes upon the map the intersecting point of these two deflection lines, which locates definitely the precise location of a fire, and can despatch rangers equipped with fire-fighting apparatus at once to the scene of the fire. It will be appreciated that these maps having indicated thereon my system of stations or observation towers and intersecting deflection lines enables the rangers or watchmen to locate instantly the exact location of a fire, as soon as observations have been taken and communicated between two stations, and that this requires no mathematical instruments or calculations and therefore does not require the services of engineers or other skilled persons.

In order that the ranger may readily designate the location of the fire which has thus been found at the intersection of two deflection lines, I place a key diagram of a township in the margin or at some convenient part of the map, in which the sections are designated by numerals in the usual manner. Thus, in the district chosen for example, the townships are divided into 36 sections in the manner indicated in the key diagram at the lower right hand corner of the map. It is, therefore, unnecessary to insert these numerals in each of the townships, as a glance at the corresponding section of the key diagram enables one to determine the particular number of the section. It will also be observed that the creeks, rivers and other topographical features are indicated upon the map. These are valuable to the ranger, as they enable him to know whether the fire is in proximity to a supply of water, whether the fire will likely be cut off by a stream, etc., thus enabling him to determine the best method of procedure in any case.

For the purpose of illustrating my invention, I have shown a map of one of the forest reservations of this country marked by the usual township divisions, but it will be evident that I may apply it to the map of a district divided in any other manner. It will also be apparent to engineers that my invention is applicable to different purposes. Thus, the map might represent a harbor having certain obstructions, submerged mines, etc., indicated thereon, and the stations or observation towers might be used to indicate precisely the position of a vessel with respect to said mines or other objects. Other uses will occur to those skilled in engineering.

I claim:—

1. A range finder map provided with main divisional lines dividing a district into sections, and having thereon indications representing a plurality of observation towers or stations and deflection lines radiating from said stations, certain of the deflection lines from each station intersecting deflection lines from one or more other stations said stations and said deflection lines being designated by suitable characters.

2. A range finder map representing a district or locality, provided with divisional lines dividing the same into sections, and having thereon indications representing a plurality of observation towers or stations and deflection lines radiating from said stations, certain of the deflection lines from each station intersecting deflection lines from one or more other stations said stations and said deflection lines being designated by suitable characters.

3. A range finder map representing a district or locality, provided with divisional lines dividing the same into sections, and having thereon indications representing a plurality of observation towers or stations and deflection lines radiating from said stations, said stations and said deflection lines being designated by suitable characters, and marginal index lines corresponding in number to the several stations, the deflection lines from the different stations terminating in the respective index lines, and the designating characters being adjacent the said terminal intersections.

4. A range finder map representing a district or locality, provided with divisional lines dividing the same into sections, and having thereon indications representing a plurality of observation towers or stations and deflection lines radiating from said stations, certain of the deflection lines from each station intersecting deflection lines from one or more other stations said stations and said deflection lines being designated by suitable characters, marginal index lines corresponding in number to the several stations, the deflection lines from the different stations terminating in the respective index lines and the designating characters being adjacent the said terminal intersections, and auxiliary index lines crossing the map upon lines corresponding with high ridges or mountain ranges which intercept the range of vision between any of the stations.

In testimony whereof I have hereunto set my hand in presence of two subscribing witnesses.

DANIEL W. ADAMS.

Witnesses:
 EUGENE C. BROWN,
 CHARLES N. MURRAY.

Copies of this patent may be obtained for five cents each, by addressing the "Commissioner of Patents, Washington, D. C."